United States Patent
Li et al.

(10) Patent No.: US 11,356,245 B2
(45) Date of Patent: Jun. 7, 2022

(54) DATA STORAGE, DATA CHECK, AND DATA LINKAGE METHOD AND APPARATUS

(71) Applicant: ADVANCED NEW TECHNOLOGIES CO., LTD., Grand Cayman (KY)

(72) Inventors: Yi Li, Hangzhou (CN); Zunkui Zhao, Hangzhou (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 0 days.

(21) Appl. No.: 17/390,871

(22) Filed: Jul. 31, 2021

(65) Prior Publication Data
US 2021/0359841 A1 Nov. 18, 2021

Related U.S. Application Data

(63) Continuation of application No. 17/122,495, filed on Dec. 15, 2020, now Pat. No. 11,082,208, which is a
(Continued)

(30) Foreign Application Priority Data
Aug. 19, 2016 (CN) .......................... 201610694496.6

(51) Int. Cl.
*H04L 9/06* (2006.01)
*G06F 16/00* (2019.01)
(Continued)

(52) U.S. Cl.
CPC ............ *H04L 9/0643* (2013.01); *G06F 16/00* (2019.01); *G06F 16/2329* (2019.01);
(Continued)

(58) Field of Classification Search
USPC ........ 713/18, 150, 163, 168, 181; 726/2, 21, 726/36; 380/255, 264, 276
See application file for complete search history.

(56) References Cited

U.S. PATENT DOCUMENTS 6,343,295 B1 * 1/2002 MacLeod .............. G06F 16/219
707/999.102
6,938,039 B1 * 8/2005 Bober ................... G06F 16/119
707/827
(Continued)

FOREIGN PATENT DOCUMENTS

CN 101236525 A 8/2008
CN 103678337 A 3/2014
(Continued)

OTHER PUBLICATIONS

Ali et al., "Blockstack: A Global Naming and Storage System Secured by Blockchains", Proceedings of the 2016 USENIX Annual Technical Conference, Jun. 22, 2016, 15 pages.
(Continued)

*Primary Examiner* — Sharif E Ullah

(57) ABSTRACT

Methods, systems, and apparatus, including computer programs encoded on computer storage media, for data tracing are provided. One of the methods includes: receiving a data backtracking request, the data backtracking request comprising a version identifier of a first data version of a target object; obtaining, from the blockchain, version identifiers of a plurality of second data versions of the target object and a plurality of data blocks in the blockchain, wherein the second data versions comprise an initial data version of the target object, and at least one of the obtained data blocks comprises a version identifier of the initial data version; and determining, based on the version identifier of the initial data version, data content corresponding to the initial data version of the target object.

18 Claims, 4 Drawing Sheets

Related U.S. Application Data continuation of application No. 16/730,873, filed on Dec. 30, 2019, now Pat. No. 10,880,078, which is a continuation of application No. 16/276,418, filed on Feb. 14, 2019, now Pat. No. 10,931,441, which is a continuation of application No. PCT/CN2017/096322, filed on Aug. 8, 2017.

(51) Int. Cl.
*G06F 16/23* (2019.01)
*H04L 9/32* (2006.01)
*H04L 67/10* (2022.01)

(52) U.S. Cl.
CPC ........ *G06F 16/2358* (2019.01); *H04L 9/3236* (2013.01); *H04L 67/10* (2013.01); *H04L 2209/38* (2013.01)

(56) References Cited

U.S. PATENT DOCUMENTS

| | | | | |
|---|---|---|---|---|
| 7,266,842 | B2* | 9/2007 | Foster | G06F 21/85 726/17 |
| 9,098,632 | B2* | 8/2015 | Cook | G06F 11/3668 |
| 9,135,285 | B1* | 9/2015 | Johnson | G06F 16/22 |
| 9,569,771 | B2* | 2/2017 | Lesavich | H04L 65/4084 |
| 9,971,784 | B2* | 5/2018 | Gokhale | G06F 16/00 |
| 10,075,298 | B2* | 9/2018 | Struttmann | H04L 9/0618 |
| 10,121,019 | B2* | 11/2018 | Struttmann | H04L 9/0618 |
| 10,242,219 | B2* | 3/2019 | Struttmann | G06F 16/9024 |
| 2002/0169971 | A1* | 11/2002 | Asano | G11B 20/0021 713/193 |
| 2003/0177119 | A1* | 9/2003 | Cole | G06F 16/273 |
| 2006/0129791 | A1* | 6/2006 | Kwon | G06F 21/575 713/1 |
| 2007/0185814 | A1* | 8/2007 | Boccon-Gibod | G06Q 20/1235 705/51 |
| 2008/0077629 | A1* | 3/2008 | Lorenz | G06F 3/065 707/999.203 |
| 2008/0133929 | A1* | 6/2008 | Gehrmann | G06F 21/51 713/179 |
| 2008/0140783 | A1* | 6/2008 | Williams | H04L 51/00 711/E12.001 |
| 2012/0310875 | A1* | 12/2012 | Prahlad | G06F 16/2465 707/602 |
| 2015/0133106 | A1* | 5/2015 | Nakamura | H04L 67/34 455/419 |
| 2015/0332283 | A1* | 11/2015 | Witchey | G06Q 10/10 705/3 |
| 2016/0027229 | A1* | 1/2016 | Spanos | G07C 13/00 705/51 |
| 2016/0092915 | A1* | 3/2016 | Lee | G06Q 30/0246 705/14.45 |
| 2016/0098723 | A1* | 4/2016 | Feeney | G06Q 20/065 705/75 |
| 2016/0125040 | A1* | 5/2016 | Kheterpal | G06Q 40/04 707/776 |
| 2016/0191243 | A1* | 6/2016 | Manning | H04L 61/1511 713/168 |
| 2016/0292672 | A1* | 10/2016 | Fay | G06Q 20/3827 |
| 2016/0342976 | A1* | 11/2016 | Davis | G06Q 20/3678 |
| 2016/0342978 | A1* | 11/2016 | Davis | G06Q 20/0655 |
| 2016/0342989 | A1* | 11/2016 | Davis | G06Q 20/385 |
| 2016/0342994 | A1* | 11/2016 | Davis | G06Q 20/4014 |
| 2017/0046651 | A1 | 2/2017 | Lin et al. | |
| 2017/0046693 | A1* | 2/2017 | Haldenby | G06Q 20/367 |
| 2017/0126702 | A1* | 5/2017 | Krishnamurthy | G06F 21/604 |
| 2017/0195406 | A1* | 7/2017 | Zhang | H04L 69/324 |
| 2017/0357009 | A1* | 12/2017 | Raab | H04L 9/3236 |
| 2018/0302417 | A1* | 10/2018 | Wilson | G06F 16/152 |
| 2019/0026496 | A1* | 1/2019 | Wilson | G06F 21/64 |
| 2019/0158475 | A1* | 5/2019 | Ateniese | H04L 9/0643 |
| 2019/0182033 | A1* | 6/2019 | Li | G06F 16/2358 |

FOREIGN PATENT DOCUMENTS

| | | |
|---|---|---|
| CN | 105045536 A | 11/2015 |
| CN | 105117489 A | 12/2015 |
| CN | 105608588 A | 5/2016 |
| CN | 105610578 A | 5/2016 |
| CN | 105721543 A | 6/2016 |
| CN | 106897348 A | 6/2017 |
| JP | 2015-95071 A | 5/2015 |
| RU | 2452017 C2 | 5/2012 |
| WO | 2014/189239 A1 | 11/2014 |

OTHER PUBLICATIONS

Chandrasekaran et al., "A multi-core version of FreeRTOS verified for datarace and deadlock freedom", 2014 Twelfth ACM/IEEE Conference on Formal Methods and Models for Codesign (MEMOCODE), Oct. 21, 2014, 10 pages.
Hui et al., "Distributed and asynchronous version identification method for BW-RAID system", China Academic Journal Electronic Publishing House, vol. 26, Mar. 15, 2016, 11 pages (English abstract).
Shigenori Ohashi et al., "Proposal and Implementation of Information Registration Method for Making Digital Contents Smart Property", The Institutes of Electronics, Information, and Communication Engineers, IEICE Technical Report, May 5, 2016, vol. 116, No. 23, pp. 13-18 (English Abstract).
Third-Party Submission under 37 CFR 1.290 Concise Description of Relevance filed Jul. 11, 2019, in U.S. Appl. No. 16/276,418, 14 pages.
First Search Report for Chinese Application No. 201610694496.6 dated Nov. 4, 2019, 1 pages.
First Examination Report for Australia Application No. 2017312177 dated Dec. 17, 2019, 4 pages.
Second Examination Report for Australia Application No. 2017312177 dated Mar. 17, 2020.
Partial Search Report for European Application No. 1784970.2 dated Jan. 2, 2020, 17 pages.
Search Report for European Application No. 1784970.2 dated Apr. 8, 2020.
Office Action Search Report for Russia Application No. 2019107593 dated Nov. 18, 2019, 20 pages.
Office Action for Russia Application No. 2019107593 dated Apr. 15, 2020.
Office Action for Korea Application No. 10-2019-7007816 dated Mar. 11, 2020.
Office Action for Japanese Application No. 2019-509462 dated Mar. 31, 2020.
Office Action for Canadian Application No. 3034034 dated Feb. 26, 2020.
Non-Final Rejection and Search Report for Taiwan Application No. 106119675 dated May 9, 2019, 6 pages.
Non-Final Rejection and Search Report for Taiwan Application No. 106119675 dated Apr. 22, 2019, 6 pages.
International Search Report and Written Opinion for Application No. PCT/CN2017/096322, dated Oct. 27, 2017, 11 pages.
International Preliminary Report on Patentability for Application No. PCT/CN2017/096322, dated Feb. 19, 2019, 11 pages.
Non-Final Office Action for U.S. Appl. No. 16/730,873 dated May 14, 2020.
Notice of Allowance for U.S. Appl. No. 16/730,873 dated Aug. 28, 2020.

* cited by examiner

DATA STORAGE, DATA CHECK, AND DATA LINKAGE METHOD AND APPARATUS

CROSS-REFERENCE TO RELATED APPLICATIONS

This application is a continuation application of U.S. patent application Ser. No. 17/122,495, filed on Dec. 15, 2020, which is a continuation application of U.S. patent application Ser. No. 16/730,873, filed on Dec. 30, 2019, which is a continuation application of U.S. patent application Ser. No. 16/276,418, filed on Feb. 14, 2019. U.S. patent application Ser. No. 16/276,418 is a continuation of International Application No. PCT/CN2017/096322, filed on Aug. 8, 2017, which is based on and claims priority to and benefits of Chinese Patent Application No. 201610694496.6 filed with the State Intellectual Property Office (SIPO) of the People's Republic of China on Aug. 19, 2016. The entire contents of the above-identified applications are incorporated herein by reference.

TECHNICAL FIELD

This application relates to the technical field of Internet information processing, particularly to a data storage, data authentication, and data tracing method and apparatus.

BACKGROUND

In the digitalized information era, data is no longer cold text records but information resources containing production values. In order to accurately analyze the information resources contained in data, the authenticity of data storage needs to be ensured, i.e., ensuring that the data stored in the database is original data.

So-called data tracing can be understood as recording the evolution information and evolution processing content of original data over its full life cycle (from creation to dissemination to extinction). The study of original data can track the evolution of original data over its full life cycle and determine the data provenance of the original data. It is a matter of significance to data providers and data requesters.

At present, a data provider stores data in a database, and stores, in the database, data content to be stored as well as other information related to the data to be stored (e.g., creator of data, whether the data has had version changes, and time of data creation). When a data requester needs to obtain data from the database, the data provider will provide the data requester with a digital signature for accessing the data to be obtained. The data requester obtains the data to be obtained from the database based on this digital signature, and checks the authenticity of the data to be obtained.

Data providers store data in a database, and a large number of databases that are used at present have a modification function. Let us suppose a data provider promises that it will provide a data requester with version A data (the digital signature corresponding to version A data is A1), but for other reasons, the data provider provides the data requester with version B data (but the data requester does not know whether the data obtained is version A data or version B data), and the digital signature obtained based on version B is B1. To have the data requester believe the obtained data is version A data, the data provider may modify the digital signature corresponding to version A data stored in the database, i.e., modify the digital signature of version A data to B1. In this way, when the data requester checks by using B1, the check result is "pass." It causes the data requester to believe the obtained version B data is the version A data that it wants to obtain, but in fact, the data obtained by the data requester is not the version A data that it wants to obtain. As a result, the data analysis result that the data requester obtains based on the obtained version B data has a large deviation from the expected result, causing loss to the data requester.

To sum up, a data storage method is urgently needed to solve the problem of inability to determine data authenticity due to easy tampering of data in current technologies.

SUMMARY

In light of the above, the embodiments of the specification provide a data storage, data authentication, and data tracing method and apparatus to solve the problem of inability to determine data authenticity due to easy tampering of data in current technologies.

The embodiments of the specification provide a data storage method, comprising:
determining a first check value of a first data version of a target object;
searching for a second check value of a second data version of the target object that is adjacent to the first data version;
creating a data block based on the first check value and the second check value and storing the data block in a blockchain, wherein the data block stored in the blockchain is immutable.

The embodiments of the specification provide a data storage apparatus, comprising:
a determining module determining a first check value of a first data version of a target object;
a searching unit searching for a second check value of a second data version of the target object that is adjacent to the first data version;
a storage module creating a data block based on the first check value and the second check value and storing the data block in a blockchain, wherein the data block stored in the blockchain is immutable.

At least one of the foregoing technical solutions adopted by the embodiments of the specification can achieve the following beneficial effect:
through determining a first check value of a first data version of a target object; searching for a second check value of a second data version of the target object that is adjacent to the first data version; creating a data block based on the first check value and the second check value and storing the data block in a blockchain. A first check value of a first data version of a target object is stored in a blockchain in the form of a data block. As the blockchain has the feature of being immutable, when a data requester obtains the data content corresponding to a first data version of a target object, it can check, based on the first check value stored in the blockchain, whether the data content corresponding to the first data version has been modified, thereby determining the authenticity of the data content corresponding to the first data version, effectively solving the problem of inability to determine the authenticity of data content due to easy modification of data content, and increasing the data analysis efficiency of the data requester.

The embodiments of the specification further provide a data authentication method, comprising:
receiving a data authentication request, the data authentication request comprising a version identifier of a data version of data to be authenticated and a check value obtained based on data content of the data to be authenticated;

based on the version identifier of the data version contained in the data authentication request, searching, in a blockchain, for a pre-stored check value corresponding to the version identifier of the data version;

based on the received check value contained in the data authentication request and the check value obtained via the searching, authenticating the data content of the data to be authenticated.

The embodiments of the specification further provide a data authentication apparatus, comprising:

a receiving module receiving a data authentication request, the data authentication request comprising a version identifier of a data version of data to be authenticated and a check value obtained based on data content of the data to be authenticated;

a searching module searching, in a blockchain, based on the version identifier of the data version contained in the data authentication request, for a pre-stored check value corresponding to the version identifier of the data version;

an authenticating module authenticating the data content of the data to be authenticated based on the received check value contained in the data authentication request and the check value obtained via the searching.

At least one of the foregoing technical solutions adopted by the embodiments of the specification can achieve the following beneficial effect:

through receiving a data authentication request, which contains a version identifier of a data version of data to be authenticated and a check value obtained based on data content of the data to be authenticated; based on the version identifier of the data version contained in the data authentication request, searching, in a blockchain, for a pre-stored check value corresponding to the version identifier of the data version; based on the received check value contained in the data authentication request and the check value obtained via the searching, authenticating the data content of the data to be authenticated. As the blockchain has the feature of being immutable, the pre-stored check value obtained from the blockchain that corresponds to the version identifier of the data version, is authentic. The authentic check value is used to check whether the data to be authenticated in a data authentication request has been tampered with, thereby ensuring the authenticity of the data to be authenticated.

The embodiments of the specification further provide a data tracing method, comprising:

receiving a data backtracking request, the data backtracking request comprising a version identifier of a first data version of the data to be backtracked;

based on the version identifier of the first data version, searching, in a blockchain, for a data block containing the version identifier of the first data version, and obtaining, from the data block, a version identifier of a second data version adjacent to the first data version;

based on the obtained version identifier of the second data version, backtracking sequentially and obtaining a data block containing the version identifier of the initial version of the data to be backtracked;

based on the data block, determining data content corresponding to the initial version of the data to be backtracked.

The embodiments of the specification further provide a data tracing apparatus, comprising:

a receiving module receiving a data backtracking request, the data backtracking request comprising a version identifier of a first data version of the data to be backtracked;

a backtracking module searching, in a blockchain, based on the version identifier of the first data version, for a data block containing the version identifier of the first data version, and obtaining, from the data block, a version identifier of a second data version adjacent to the first data version; based on the obtained version identifier of the second data version, backtracking sequentially to obtain a data block containing the version identifier of the initial version of the data to be backtracked;

a determining module determining data content corresponding to the initial version of the data to be backtracked based on the data block.

At least one of the foregoing technical solutions adopted by the embodiments of the specification can achieve the following beneficial effect:

through receiving a data backtracking request, the data backtracking request comprising a version identifier of a first data version of the data to be backtracked; based on the version identifier of the first data version, searching, in a blockchain, for a data block containing the version identifier of the first data version, and obtaining, from the data block, a version identifier of a second data version adjacent to the first data version; based on the obtained version identifier of the second data version, backtracking sequentially to obtain a data block containing the version identifier of the initial version of the data to be backtracked; based on the data block, determining data content corresponding to the initial version of the data to be backtracked. Because both a version identifier of a first data version of a target object and a version identifier of a second data version adjacent to the first data version are stored in the form of a data block in the blockchain, and because the blockchain has the feature of being immutable and adopts a linked data structure, it is possible to backtrack and find evolved versions of the data to be backtracked as well as the data content corresponding to every evolved version, and ensure the authenticity of the data evolution.

In a further aspect, the specification provides a data storage method, comprising determining a first check value of a first version of a target object, obtaining a second check value of a second version of the target object, creating a data block comprising the first check value and the second check value, and storing the data block in a blockchain, wherein the data block stored in the blockchain is immutable.

In some embodiments, the determining a first check value of a first version of a target object comprises determining a content summary of the first version of the target object and calculating the first check value based on the content summary using a preset algorithm.

In some embodiments, the creating a data block comprises writing the first check value and the second check value in a header of the data block.

In some embodiments, the creating a data block comprises writing in a body of the data block a content summary of the first version of the target object, the second check value, or content of the first version of the target object.

In some embodiments, the data storage method further comprises storing content of the first version of the target object in a cloud data gateway or a database.

In some embodiments, the data storage method further comprises storing a mapping relationship between a version identifier of the first version of the target object and a block identifier of the data block.

In some embodiments, the storing the data block in a blockchain comprises adding the data block to the blockchain according to a linked data structure associated with the blockchain.

In another aspect, the specification provides a non-transitory computer-readable storage medium configured with instructions executable by one or more processors to cause the one or more processors to perform operations comprising determining a first check value of a first version of a target object, obtaining a second check value of a second version of the target object, creating a data block comprising the first check value and the second check value, and storing the data block in a blockchain, wherein the data block stored in the blockchain is immutable.

In another aspect, the specification provides a system comprising a processor and a non-transitory computer-readable storage medium storing instructions that, when executed by the processor, cause the system to perform operations comprising determining a first check value of a first version of a target object, obtaining a second check value of a second version of the target object, creating a data block comprising the first check value and the second check value, and storing the data block in a blockchain, wherein the data block stored in the blockchain is immutable.

In a further aspect, the specification provides a data authentication method comprising receiving a data authentication request comprising a version identifier of a version of a target object and a check value determined based on content of the target object, obtaining from a blockchain a pre-stored check value corresponding to the version identifier, and authenticating the content of target object by comparing the check value in the data authentication request and the pre-stored check value obtained from the blockchain.

In some embodiments, the authenticating the content of target object comprises determining that the content of the target object is authentic if the check value in the data authentication request is identical to the pre-stored check value obtained from the blockchain and determining that the content of the target object has been modified if the check value in the data authentication request is not identical to the pre-stored check value obtained from the blockchain.

In some embodiments, the obtaining from a blockchain a pre-stored check value corresponding to the version identifier comprises determining, based on pre-stored mapping relationships between one or more version identifiers and one or more block identifiers, a block identifier of a data block corresponding to the version identifier in the data authentication request and obtaining the pre-stored check value from the data block having the determined block identifier.

In another aspect, the specification provides a non-transitory computer-readable storage medium configured with instructions executable by one or more processors to cause the one or more processors to perform operations comprising receiving a data authentication request comprising a version identifier of a version of a target object and a check value determined based on content of the target object, obtaining from a blockchain a pre-stored check value corresponding to the version identifier, and authenticating the content of target object by comparing the check value in the data authentication request and the pre-stored check value obtained from the blockchain.

In another aspect, the specification provides a system comprising a processor and a non-transitory computer-readable storage medium storing instructions that, when executed by the processor, cause the system to perform operations comprising receiving a data authentication request comprising a version identifier of a version of a target object and a check value determined based on content of the target object, obtaining from a blockchain a pre-stored check value corresponding to the version identifier, and authenticating the content of target object by comparing the check value in the data authentication request and the pre-stored check value obtained from the blockchain.

In a further aspect, the specification provides a data tracing method comprising receiving a data backtracking request comprising a version identifier corresponding to a first version of a target object, identifying, based on the first version identifier, a data block in a blockchain that comprises a version identifier corresponding to an initial version of the target object, and obtaining, based on the identified data block, content of the initial version of the target object.

In some embodiments, the data block comprising the version identifier associated with the initial version of the target object is identified based on that the data block further comprises a version identifier that is null.

In some embodiments, the identifying comprises identifying a data block in the blockchain that comprises the version identifier corresponding to the first version of the target object, obtaining a version identifier corresponding to a second version of the target object from the identified data block, and backtracking sequentially through one or more additional data blocks in the blockchain based on the obtained version identifier corresponding to the second version of the target object to identify the data block that comprises the version identifier corresponding to the initial version of the target object.

In some embodiments, the backtracking comprises identifying a data block in the blockchain that comprises the version identifier corresponding to the second version of the target object, obtaining a version identifier corresponding to a version of the target object previous and adjacent to the second version, identifying an additional data block in the blockchain that comprises the version identifier corresponding to the previous version of the target object, determining if the additional data block comprises the version identifier corresponding to the initial version of the target object, if the additional data block is determined not to comprise the version identifier corresponding to the initial version of the target object, trigging cyclic execution of the above steps, and if the additional data block is determined to comprise the version identifier corresponding to the initial version of the target object, terminate the backtracking.

In another aspect, the specification provides a non-transitory computer-readable storage medium configured with instructions executable by one or more processors to cause the one or more processors to perform operations comprising receiving a data backtracking request comprising a version identifier corresponding to a first version of a target object, identifying, based on the first version identifier, a data block in a blockchain that comprises a version identifier corresponding to an initial version of the target object, and obtaining, based on the identified data block, content of the initial version of the target object.

In another aspect, the specification provides a system comprising a processor and a non-transitory computer-readable storage medium storing instructions that, when executed by the processor, cause the system to perform operations comprising receiving a data backtracking request comprising a version identifier corresponding to a first version of a target object, identifying, based on the first version identifier, a data block in a blockchain that comprises a version identifier corresponding to an initial version of the target object, and obtaining, based on the identified data block, content of the initial version of the target object.

The foregoing descriptions are only summary of the technical solutions of the specification. In order to more clearly understand the technical means of the specification for implementation according to the content of the specification and to make the foregoing and other objectives, features, and advantages evident and easy to understand, particular embodiments of the specification will now be described below.

BRIEF DESCRIPTION OF THE DRAWINGS

The drawings described herein are intended to provide a further understanding of the application and constitute a part of this application, and the embodiments of the specification and their descriptions are intended to explain the application and not to limit the specification. In the drawings.

DETAILED DESCRIPTION

Figure 1:
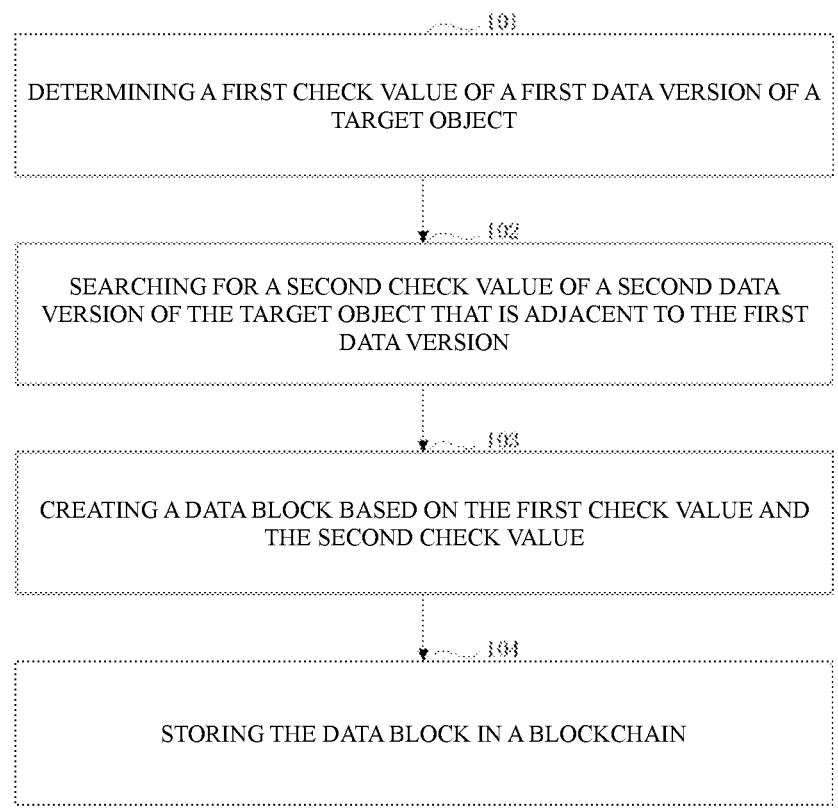
FIG. 1 is a flow diagram of a data storage method according to some embodiments of the specification.

In order to achieve the objectives of the application, the embodiments of the specification provide a data storage, data authentication, and data tracing method and apparatus, storing a first check value of a first data version of a target object in a blockchain in the form of a data block. As the blockchain has the feature of being immutable, when a data requester obtains the data content corresponding to the first data version of a target object, it can check, based on the first check value stored in the blockchain, whether the data content corresponding to the first data version has been modified, thereby determining the authenticity of the data content corresponding to the first data version, effectively solving the problem of inability to determine the authenticity of data content due to easy modification of data content, and increasing the data analysis efficiency of a data requester.

It should be noted that the blockchain recorded in the embodiments of the specification may be understood as a reliable database, and the reliable database is a database similar to a non-relational database. Compared with a conventional database, the reliable database has the following difference: the reliable database is characterized by being decentralized and trustless. So-called decentralized means that in a system based on a blockchain, there is no centralized hardware or management body, the rights and obligations between any nodes of the system are equal, and the damage or loss of any node will not affect the operation of the whole system.

So-called trustless means that participation in data exchange between any nodes of the whole system does not require mutual trust, the operating rules of the whole system are open and transparent, and the data content of the whole system is open, too, so within a range of rules and times set by the system, no node can or has a way to cheat other nodes.

The technical solutions recorded in the embodiments of the specification propose a data structure (subsequently it may be referred to as a "data block"). This data structure contains a data header and a data body. The data header stores a check value of a current data version of a target object and a check value of a previous data version adjacent to the current data version to facilitate subsequent data tracing of the target object. The data body may store data content of the target object corresponding to the current data version or may store other content. No limitation is set here. In this way, through this data structure and a blockchain, the integrity and authenticity of the target object and its evolutions are ensured.

The technical solutions of the specification will now be clearly and completely described by referring to the embodiments and accompanying drawings of the specification. Obviously, the described embodiments are only some and not all of the embodiments of the specification. Based on the embodiments in the specification, all other embodiments obtained by those of ordinary skill in the art without creative effort shall fall within the scope of the application.

Below, the technical solutions according to the embodiments of the specification are described in detail by referring to the accompanying drawings.

FIG. 1 is a flow diagram of a data storage method according to some embodiments of the specification. The method may be as shown below.

Step 101: determining a first check value of a first data version of a target object.

In the embodiments of the specification, the target object here may be data in any form. It may be a business form, a manuscript of a book, or a software source code; or it may be a set of pictures, a piece of music, or a video. No limitation is set here.

The data versions of the target object here may refer to different data content evolved and generated over the full life cycle of the target object. An identifier may be set for every piece of data content. This identifier may be called a version identifier of a data version.

For example: For a video, every part of the video (or every season) may be called a data version. Supposing the first part of video A corresponds to data version 1.0, then in the evolution process the second part of video A corresponds to data version 2.0, the third part of video A corresponds to data version 3.0, . . . , the $N^{th}$ part of video A corresponds to data version n.0.

As another example: For application software, a plurality of versions of application software may appear according to development needs. Let us suppose that the versions of the application software in the evolution process of the application software include version 1.0, version 1.0.1, version 1.0.1.1, version 2.0, version 2.0.1, . . . .

The first data version of the target object in the embodiments of the specification may refer to a current data version of the target object. Taking the foregoing application software for example, the version number corresponding to the first data version is 2.0.1.

For example, in the embodiments of the specification, the methods for determining a first check value of a first data version of a target object include, without limitation, the following method:

Firstly, determining a data content summary of the target object in the first data version; secondly, calculating a first check value of a first data version of the target object according to a preset algorithm and the data content summary.

For example: A description is made by using the example of a software source code as the target object. The data content summary of the current version of the software source code is determined. A hash algorithm is then used to process the data content summary to obtain a hash value of the current version of the software source code (here, it may also be referred to as a first check value).

In some embodiments, the preset algorithm may be a hash algorithm, or may be any other (for example: SHA-1) algorithm. No limitation is set here.

Step 102: searching for a second check value of a second data version of the target object that is adjacent to the first data version.

A second data version of the target object in the embodiments of the specification may refer to a previous data version adjacent to the current data version of the target object. Taking the foregoing application software for example, the version number corresponding to a second data version is 2.0.

For example, a version identifier of a second data version adjacent to the first data version of the target object is determined;

a data block recording a version identifier of the second data version is searched for in the blockchain, and a second check value of a second data version of the target object is read from the data block.

In some embodiments, if the current data version of a target object is the original data version (example: version 1.0 of application software), as there is not a previous data version adjacent to the first data version, there is no need to search for the second check value recorded in Step 102.

Further, after determining a version identifier of a second data version adjacent to the first data version of the target object, the method for determining a first check value as recorded in Step 101 may be referenced to obtain a second check value. In some embodiments, if a second check value is obtained according to the method for determining a first check value as recorded in Step 101, it needs to be ensured that the data content of the second data version adjacent to the first data version of the target object has not been tampered with.

Or a data block recording a version identifier of the second data version is searched for in the blockchain, then the data content summary of the second data version of the target object is read from the data block, and then a second check value is obtained by referring to the method for determining a first check value as recorded in Step 101.

Step 103: creating a data block based on the first check value and the second check value.

In Step 103, after obtaining a first check value and a second check value of the target object, a data block is created based on the first check value and the second check value.

For example, the created data block contains a data header and a data body.

The first check value and the second check value are written in the data header of the data block according to a preset format.

Table 1 is a schematic table of the check values written in a data header of a data block.

TABLE 1

Data header
First check value: 1234567890ZXCV
Second check value: null
Time label: XXXX year YYYY month ZZZZ day 10:00:00

From Table 1, it may be seen that the generation time label of the data block is: XXXX year YYYY month ZZZZ day 10:00:00, the first check value written in the data block is 1234567890ZXCV, and the second check value is null. Thus it can be seen that the data block is the initial data of a target object (for example: data), i.e., it is the data origin of a target object.

Optionally, because a first check value/second check value of a target object is obtained through an irreversible algorithm, different data versions of a target object get different check values through calculation, i.e., the first check value/second check value of a target object is unique.

Table 2 is a schematic table of the check values written in a data header of a data block.

TABLE 2

Data header portion
First check value: ! @#¥ % . . . &* ( ) ASDF
Second check value: 1234567890ZXCV
Time label: MMMM year NNNN month ZZZZ day 14:00:00

From Table 2, it may be seen that the generation time label of the data block is: MMMM year NNNN month ZZZZ day 14:00:00, the first check value written in the data block is !@#¥% . . . &* ( ) ASDF, and the second check value is 1234567890ZXCV. Thus it can be seen that, because the second check value in Table 2 is the same as the first check value in Table 1, the data version corresponding to the data block shown in Table 1 is a previous data version adjacent to the data version corresponding to the data block as shown in Table 2.

The data header of a data block may also store the version identifiers of two adjacent data versions, i.e., a version identifier of a first data version and a version identifier of a second data version.

Optionally, in addition to a data header, the created data block also comprises a data body. The data content summary of the target object in the first data version, or the second check value, or the data content of the first data version of the target object may be written in the data body of the data block.

Figure 2:
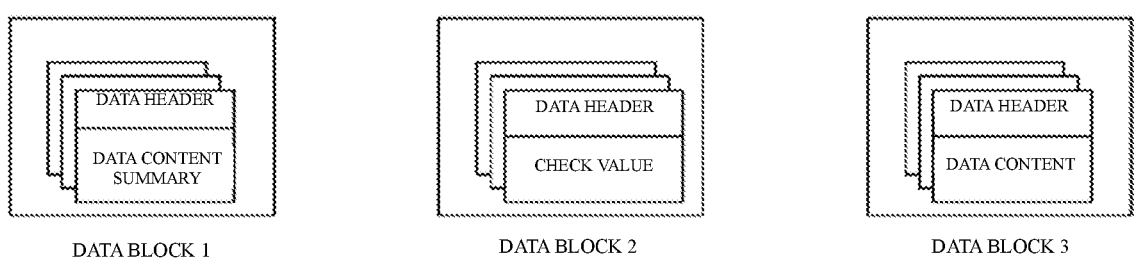
FIG. 2 is a structural diagram of data blocks created in various blocks in a blockchain.

FIG. 2 is a structural diagram of data blocks created in various blocks in a blockchain.

From FIG. 2, it may be seen that data block 1, data block 2, and data block 3 correspond to the same target object. In the data body of data block 1, a data content summary of a current data version/an adjacent previous data version is stored. In the data body of data block 2, a check value of a current data version/an adjacent previous data version is stored. In the data body of data block 3, data content of a current data version/an adjacent previous data version is stored.

In another embodiment of the specification, the data content of a target object may be stored in a data block, and it may also be stored in a cloud data gateway or database.

When the data volume of data content is small, the data block 3 approach may be selected with priority as a way to store the data content.

For example, the data content of the first data version of the target object is stored in a cloud data gateway or a database.

The data body of a data block not only may store the content described above but also may record a digital signature of a target object that is provided by the data provider so as to facilitate a data requester to authenticate the identity of the data provider. The data body may also record data block creation time and other relevant information, a version identifier of a data version, etc. No limitation is set here.

Step 104: storing the data block in a blockchain.

Here, the data block stored in the blockchain is immutable.

In Step 104, the data block is added to the blockchain according to a linked data structure.

For example, a newly created data block is added to the tail of a data block that has been connected to the blockchain.

In another embodiment of the specification, after storing the data block in the blockchain, the method further comprises:

storing a mapping relationship between a version identifier of a first data version of the target object and a block identifier of the data block.

alternatively, storing a mapping relationship between a version identifier of a first data version of the target object and a block identifier of the data block.

In the embodiments of the specification, storing a data block in the blockchain may also be referred to as executing the operation of adding a data block to the blockchain so as to store it in the blockchain.

Through the technical solutions recorded in the embodiments of the specification, a first check value of a first data version of a target object is determined, and a second check value of a second data version of the target object that is adjacent to the first check value is searched for; based on the first check value and the second check value, a data block is created, and the data block is stored in a blockchain. A first check value of a first data version of a target object is stored in a blockchain in the form of a data block. As the blockchain has the feature of being immutable, when a data requester obtains the data content corresponding to a first data version of a target object, it can check, based on the first check value stored in the blockchain, whether the data content corresponding to the first data version has been modified, thereby determining the authenticity of the data content corresponding to the first data version, effectively solving the problem of inability to determine the authenticity of data content due to easy modification of data content, and increasing the data analysis efficiency of the data requester.

Figure 3:
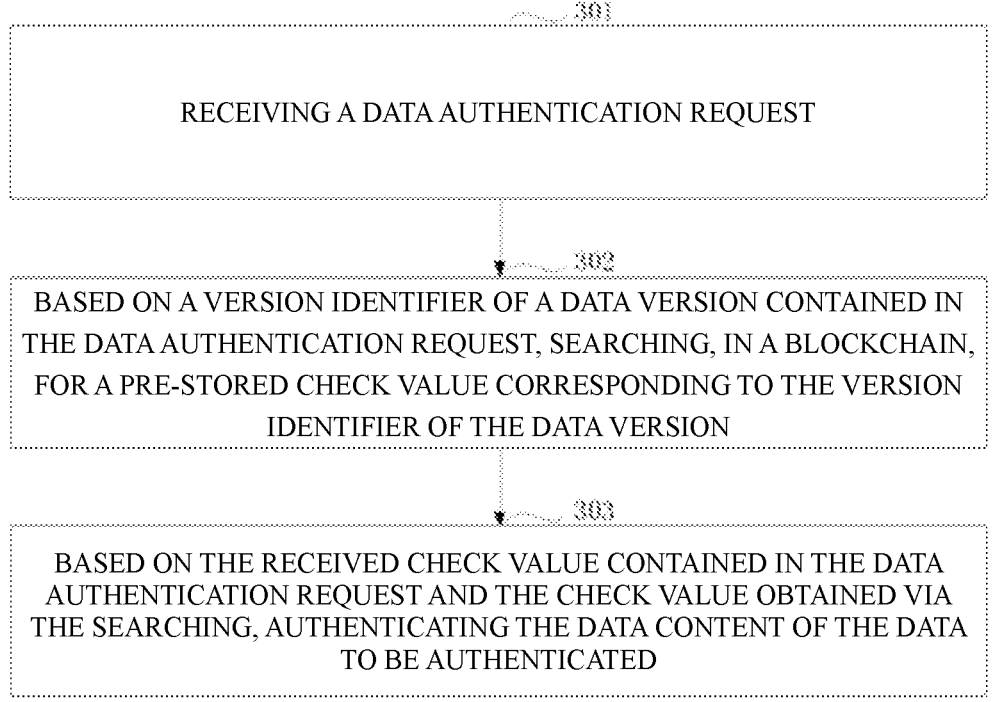
FIG. 3 is a flow diagram of a data authentication method according to some embodiments of the specification.

Based on a same inventive concept, FIG. 3 is a flow diagram of a data authentication method according to some embodiments of the specification. The method may be as shown below.

Step 301: receiving a data authentication request.

The data authentication request contains a version identifier of a data version of data to be authenticated and a check value obtained based on data content of the data to be authenticated.

In Step 301, the executive agent of the embodiments of the specification may be a blockchain, or it may be another device. No limitation is set here.

For example, when a data requester receives data provided by a data provider, it may consider the provided data as data to be authenticated, determine a version identifier of the data version of the data to be authenticated, and obtain through calculation a check value of the data to be authenticated based on the obtained data content of the data to be authenticated.

In this case, in order to ensure the received data to be authenticated is authentic, the data requester sends a data authentication request to the blockchain to check whether the data provided by the data provider has been tampered with.

Step 302: based on a version identifier of a data version contained in the data authentication request, searching, in a blockchain, for a pre-stored check value corresponding to the version identifier of the data version.

In Step 302, because a data block is generated during storage of a target object, and the data block is stored in a blockchain, a mapping relationship between a version identifier of a first data version of the target object and a block identifier of the data block is stored when the data block is stored in the blockchain.

When a data authentication request is received, the block identifier of the data block corresponding to the version identifier of the data version contained in the data authentication request is determined based on pre-stored mapping relationships between version identifiers of the data versions, the unit identifier of data blocks, and block identifiers of blocks.

The check value corresponding to the version identifier of the data version is read from the data block corresponding to the block identifier.

The check value corresponding to the version identifier of the data version obtained in Step 302 is generated during storage of the target object and is stored in a blockchain, so the check value obtained via the searching is authentic.

Step 303: based on the received check value contained in the data authentication request and the check value obtained via the searching, authenticating the data content of the data to be authenticated.

In Step 303, the received check value contained in the data authentication request is compared with the check value obtained via the searching.

When the received check value contained in the data authentication request is the same as the check value obtained via the searching, it is determined that the data content of the data to be authenticated is authentic.

When the received check value contained in the data authentication request is different from the check value obtained via the searching, it is determined that the data content of the data to be authenticated has been modified.

Through the technical solutions provided by the embodiments of the specification, a data authentication request is received, which contains a version identifier of a data version of data to be authenticated and a check value obtained based on data content of the data to be authenticated; based on the version identifier of the data version contained in the data authentication request, a pre-stored check value corresponding to the version identifier of the data version is searched for in the blockchain; based on the received check value contained in the data authentication request and the check value obtained via the searching, the data content of the data to be authenticated is authenticated. As the blockchain has the feature of being immutable, the pre-stored check value in the blockchain that is obtained via the searching and corresponding to the version identifier of the data version, is authentic. The authentic check value is used to check whether the data to be authenticated in a data authentication request has been tampered with, thereby ensuring the authenticity of the data to be authenticated.

Figure 4:
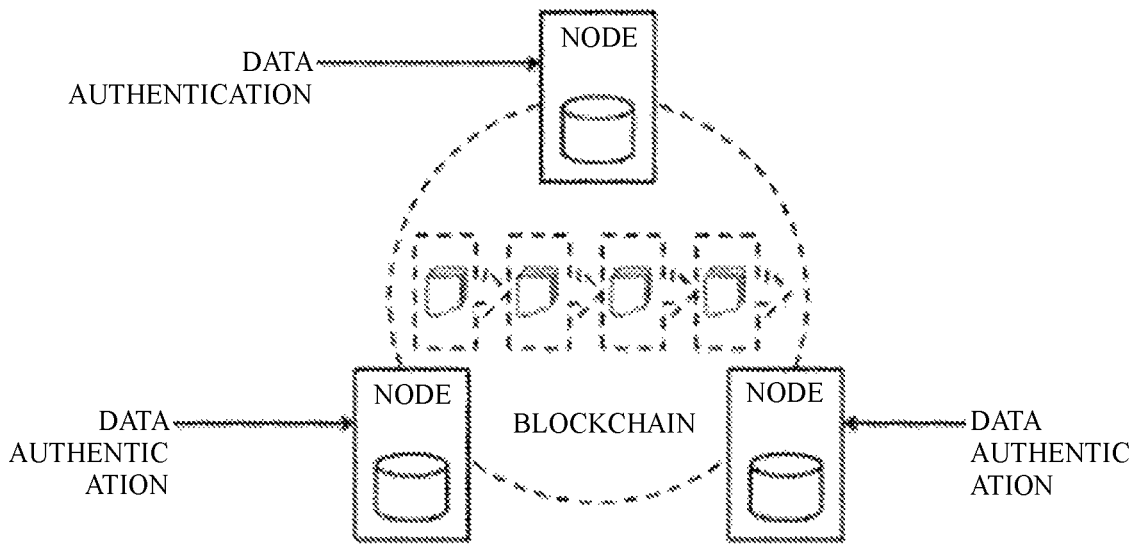
FIG. 4 is a schematic diagram of a scenario of a data authentication method according to some embodiments of the specification.

FIG. 4 is a schematic diagram of a scenario of a data authentication method according to some embodiments of the specification.

From FIG. 4, it may be seen that the blockchain contains a plurality of data nodes. These data nodes may receive data authentication requests sent by different users. Corresponding data information is searched for in the blockchain based on the data information carried in the data authentication request (here it may refer to a check value). Based on the received data information and data information obtained via the searching, the data to be authenticated in the data authentication request is authenticated to ensure the data requester can obtain authentic and valid data.

Figure 5:
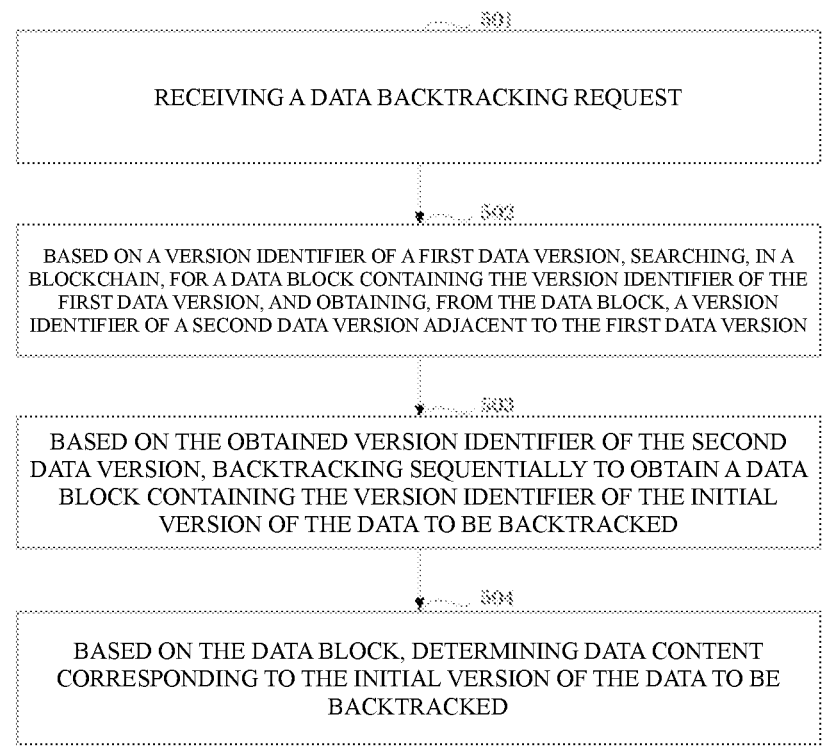
FIG. 5 is a flow diagram of a data tracing method according to some embodiments of the specification.

FIG. 5 is a flow diagram of a data tracing method according to some embodiments of the specification. The method may be as shown below.

Step 501: receiving a data backtracking request.

The data backtracking request contains a version identifier of a first data version of data to be backtracked.

In Step 501, when the evolution process or evolution history of a target object needs to be searched for, the operations of the embodiments of the specification may be initiated, i.e., sending a data backtracking request. The data backtracking request contains a version identifier of a first data version of the data to be backtracked.

Here, the version identifier of a first data version may be the version identifier of a current data version, or it may be the version identifier of any data version. No limitation is set here.

Here, the version identifier of a first data version is used to determine a starting point for backtracking the data to be backtracked. For example: application software, with a current data version of 3.0. Once a backtracking request is initiated, the version identifier of the data version carried in the backtracking request may be 3.0, or may be 2.0, etc. No limitation is set here.

Step 502: based on a version identifier of a first data version, searching, in a blockchain, for a data block containing the version identifier of the first data version, and obtaining, from the data block, a version identifier of a second data version adjacent to the first data version.

In Step 502, because the data block not only stores a version identifier of a first data version but also stores a version identifier of a previous second data version adjacent to the version identifier of the first data version, a data block containing the version identifier of the first data version may be obtained based on the version identifier of the first data version, and the version identifier of a previous second data version adjacent to the version identifier of the first data version is obtained from the data block.

Step 503: based on the obtained version identifier of the second data version, backtracking sequentially to obtain a data block containing the version identifier of the initial version of the data to be backtracked.

In Step 503, the obtained version identifier of the second data version is chosen as a starting point and backtracked in turn by the method described in Step 502 to find a data block containing the version identifier of the initial version of the data to be backtracked.

For example, based on the obtained version identifier of a data version, the following operations are executed until a data block containing the version identifier of the initial version of the data to be backtracked is obtained:

searching, in the blockchain, for a data block containing a version identifier of the obtained data version, and obtaining from the data block a version identifier of a previous data version adjacent to the obtained data version;

triggering cyclic execution of the foregoing operation until a data block containing the version identifier of the initial version of the data to be backtracked is obtained.

The obtained version identifier of a data version may be a version identifier of any data version except the first data version.

Step 504: based on the data block, determining data content corresponding to the initial version of the data to be backtracked.

In the embodiments of the specification, whenever a version identifier of a data version is obtained, the data content corresponding to the data version may be determined. In this way, the evolution process of the data to be backtracked may be analyzed based on the obtained data content, to authentically and effectively analyze the production value contained in the data to be backtracked.

Through the technical solutions of the embodiments of the specification, a data backtracking request is received, which contains a version identifier of a first data version of data to be backtracked; based on the version identifier of the first data version, a data block containing the version identifier of the first data version is searched for in the blockchain, and a version identifier of a second data version adjacent to the first data version is obtained from the data block; based on the obtained version identifier of the second data version, sequential backtracking is performed and a data block containing the version identifier of the initial version of the data to be backtracked is obtained; based on the data block, the data content corresponding to the initial version of the data to be backtracked is determined. Because both a version identifier of a first data version of a target object and a version identifier of a second data version adjacent to the first data version are stored in the form of a data block in the blockchain, and because the blockchain has the feature of being immutable and adopts a linked data structure, it is possible to backtrack and find evolved versions of the data to be backtracked as well as the data content corresponding to every evolved version, and ensure the authenticity of the data evolution.

Figure 6:
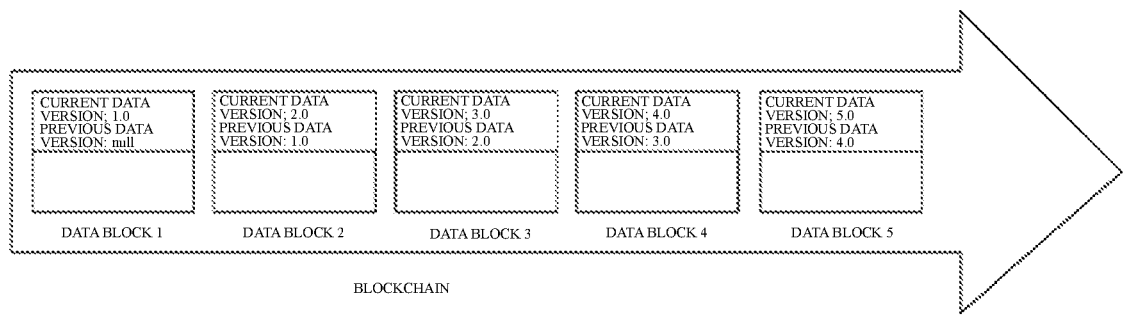
FIG. 6 is a schematic diagram of a scenario of a data tracing method according to some embodiments of the specification.

FIG. 6 is a schematic diagram of a scenario of a data tracing method according to some embodiments of the specification.

From FIG. 6, it may be seen that as the blockchain adopts a linked data structure. When one of data blocks is determined, other data blocks associated with the data block can be obtained according to the features of the linked data structure, thus achieving the objective of tracing the data origin, and meanwhile ensuring that the obtained information is authentic.

Let us suppose there are five data blocks corresponding to the target object. They are data block 1, data block 2, data block 3, data block 4 and data block 5. Here, data blocks storing version identifiers of data versions are taken as an example.

The version identifiers of data versions stored in data block 5 are 5.0 and 4.0. The version identifiers of data versions stored in data block 4 are 4.0 and 3.0. The version identifiers of data versions stored in data block 3 are 3.0 and 2.0. The version identifiers of data versions stored in data block 2 are 2.0 and 1.0. The version identifier of the data version stored in data block 1 is 1.0. During data tracing, data block 51 is determined at first, followed by data block 4, data block 3 and data block 2, and lastly data block 1. In this way, the objective of data tracing can be achieved completely.

Figure 7:
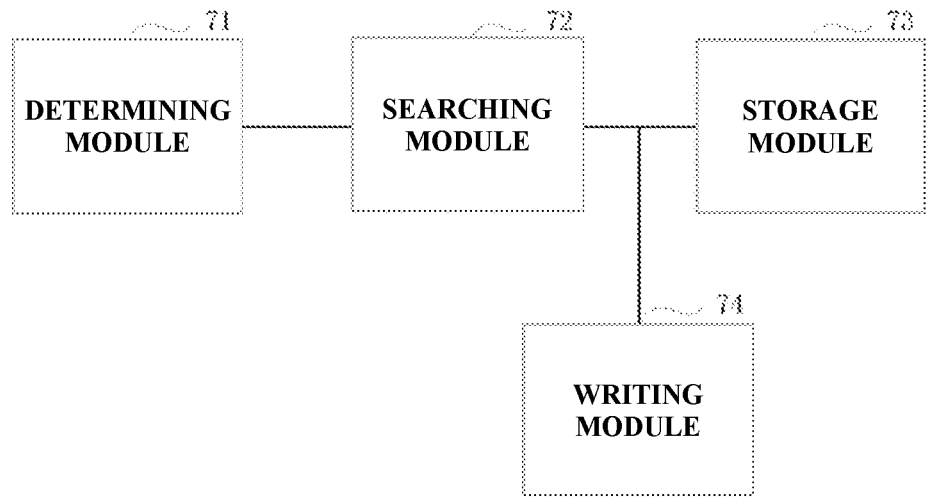
FIG. 7 is a structural diagram of a data storage apparatus according to some embodiments of the specification.

Based on the same inventive concept, FIG. 7 is a structural diagram of a data storage apparatus according to some embodiments of the specification. The data storage apparatus comprises: a determining module 71, a searching module 72, and a storage module 73. Here:

the determining module 71 determines a first check value of a first data version of a target object;

the searching module 72 searches for a second check value of a second data version of the target object that is adjacent to the first data version;

the storage module 73 creates, based on the first check value and the second check value, a data block and stores the data block in a blockchain, wherein the data block stored in the blockchain is immutable.

In another embodiment of the specification, the determining module 71 determining a first check value of a first data version of a target object comprises:

determining a data content summary of the target object in the first data version;

according to a preset algorithm and the data content summary, calculating to obtain the first check value of the first data version of the target object.

In another embodiment of the specification, the storage module 72 creating a data block based on the first check value and the second check value comprises:

creating a data block, and writing the first check value and the second check value in the data header of the data block according to a preset format.

In another embodiment of the specification, the data storage apparatus further comprises: a writing module 74. Here:

the writing module 74 writes the data content summary of the target object in the first data version, or the second check value, or data content of the first data version of the target object in a data body of the data block.

In another embodiment of the specification, the storage module 72 stores the data content of the first data version of the target object in a cloud data gateway or a database.

In another embodiment of the specification, the storage module 72 stores a mapping relationship between the version identifier of the first data version of the target object and a block identifier of the data block after storing the data block in a block of the blockchain.

In another embodiment of the specification, the storage module 72 storing the data block in the blockchain comprises:

according to a linked data structure, adding the data block to the blockchain.

It should be noted that the data storage apparatus according to the embodiments of the specification may be achieved by hardware or software. No limitation is set here. The data storage apparatus stores a first check value of a first data version of a target object in the form of a data block in a blockchain. As the blockchain has the feature of being immutable, when a data requester obtains the data content corresponding to the first data version of the target object, it can check, based on the first check value stored in the blockchain, whether the data content corresponding to the first data version has been modified, thereby determining the authenticity of the data content corresponding to the first data version, effectively solving the problem of inability to determine the authenticity of data content due to easy modification of data content, and increasing the data analysis efficiency of a data requester.

Figure 8:
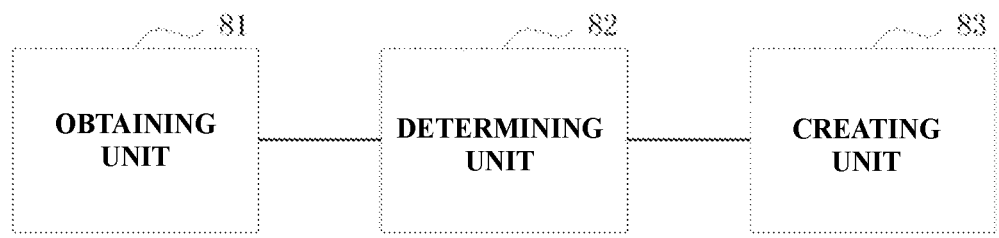
FIG. 8 is a structural diagram of a data authentication apparatus according to some embodiments of the specification.

FIG. 8 is a structural diagram of a data authentication apparatus according to some embodiments of the specification. The data authentication apparatus comprises: a receiving module 81, a searching module 82, and a authenticating module 83. Here:

the receiving module 81 receives a data authentication request, which contains a version identifier of a data version of data to be authenticated and a check value obtained based on data content of the data to be authenticated;

the searching module 82 searches, in a blockchain, based on the version identifier of the data version contained in the data authentication request, for a pre-stored check value corresponding to the version identifier of the data version;

the authenticating module 83 authenticates the data content of the data to be authenticated based on the received check value contained in the data authentication request and the check value obtained via the searching.

In another embodiment of the specification, the authenticating module 83 authenticating the data content of the data to be authenticated based on the received check value contained in the data authentication request and the check value obtained via the searching comprises:

when the received check value contained in the data authentication request is same as the check value obtained via the searching, determining that the data content of the data to be authenticated is authentic;

when the received check value contained in the data authentication request is different from the check value obtained via the searching, determining that the data content of the data to be authenticated has been modified.

In another embodiment of the specification, the searching unit 82 searching, in the blockchain, based on the version identifier of the data version contained in the data authentication request, for a pre-stored check value corresponding to the version identifier of the data version comprises:

based on pre-stored mapping relationship between version identifiers of data versions and block identifiers of data blocks, determining the block identifier of the data block corresponding to the version identifier of the data version in the data authentication request;

reading a check value corresponding to the version identifier of the data version from the determined data block corresponding to the block identifier.

It should be noted that the data authentication apparatus according to the embodiments of the specification may be achieved by hardware or software. No limitation is set here. As the blockchain has the feature of being immutable, the searched-for pre-stored check value in the blockchain that corresponds to the version identifier of the data version, is authentic. The authentic check value is used to check whether the data to be authenticated in a data authentication request has been tampered with, thereby ensuring the authenticity of the data to be authenticated.

Figure 9:
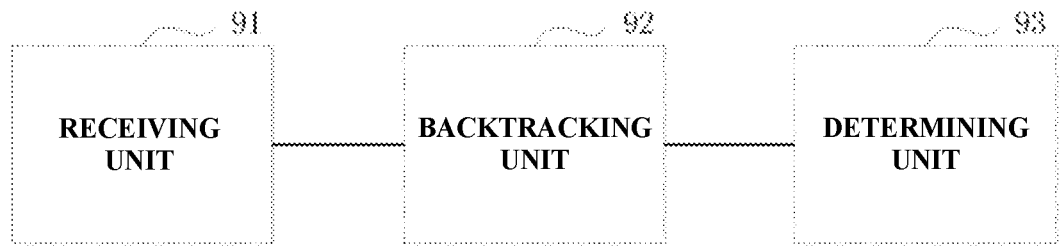
FIG. 9 is a structural diagram of a data tracing apparatus according to some embodiments of the specification.

FIG. 9 is a structural diagram of a data tracing apparatus according to some embodiments of the specification. The data tracing apparatus comprises: a receiving module 91, a backtracking module 92, and a determining module 93. Here:

the receiving module 91 receives a data backtracking request, the data backtracking request comprising a version identifier of a first data version of the data to be backtracked;

the backtracking module 92 searching, in the blockchain, based on the version identifier of the first data version, for a data block containing the version identifier of the first data version, and obtains, from the data block, a version identifier of a second data version adjacent to the first data version; based on the obtained version identifier of the second data version, it performs sequential backtracking and obtains a data block containing the version identifier of the initial version of the data to be backtracked;

the determining module 93 determines the data content corresponding to the initial version of the data to be backtracked based on the data block.

In another embodiment of the specification, the backtracking module 92, based on the obtained version identifier of the second data version, performing sequential backtracking to obtain a data block containing the version identifier of the initial version of the data to be backtracked comprises:

based on the obtained version identifier of a data version, executing the following operation until a data block containing the version identifier of the initial version of the data to be backtracked is obtained:

searching, in the blockchain, for a data block containing a version identifier of the obtained data version, and obtaining from the data block a version identifier of a previous data version adjacent to the obtained data version;

triggering cyclic execution of the foregoing operation until a data block containing the version identifier of the initial version of the data to be backtracked is obtained.

It should be noted that the data tracing apparatus according to the embodiments of the specification may be achieved by hardware or software. No limitation is set here. Because both a version identifier of a first data version of a target object and a version identifier of a second data version adjacent to the first data version are stored in the form of a data block in the blockchain, and because the blockchain has the feature of being immutable and adopts a linked data structure, it is possible to backtrack and find evolved versions of the data to be backtracked as well as the data content corresponding to every evolved version, and ensure the authenticity of the data evolution.

Those skilled in the art should understand that the embodiments of the specification may be provided as methods, systems, or computer program products, so the specification may adopt embodiments in the form of pure software, pure hardware, or a combination of software and hardware. Furthermore, the specification may adopt the form of a computer program product implemented on one or a plurality of computer-usable storage media (including but not limited to disk memory, CD-ROM, and optical memory) that contain computer-usable program codes.

The embodiments are described by referring to the flow charts and/or block diagrams of the methods, devices (systems), and computer program products. It should be understood that every flow and/or block in the flow charts and/or block diagrams and combinations of the flows and/or blocks in the flow charts and/or block diagrams may be achieved through computer program instructions. These computer program instructions may be provided to the processor of a general-purpose computer, special-purpose computer, embedded processor, or other programmable data processing equipment to generate a machine so that through the instructions executed by the processor of the computer or other programmable data processing equipment, an apparatus for achieving the functions designated in one or a plurality of flows in the flow charts and/or one or a plurality of blocks in the block diagrams is generated.

These computer program instructions may also be stored in a computer-readable memory that can guide a computer or other programmable data processing equipment to work in a specific way so that the instructions stored in the computer-readable memory generate a product comprising the instruction apparatus. The instruction apparatus achieves the functions designated in one or a plurality of flows in the flow charts and/or one or a plurality of blocks in the block diagrams.

These computer program instructions may also be loaded to a computer or other programmable data processing equipment so that a series of operating steps are executed on the computer or other programmable data processing equipment to generate the processing achieved by computer. Thus, the instructions executed on the computer or other programmable data processing equipment provide steps for achieving the functions designated in one or a plurality of flows in the flow charts and/or one or a plurality of blocks in the block diagrams.

In a typical configuration, the computing equipment comprises one or a plurality of processors (CPU), I/O interfaces, network interfaces, and internal memories.

The internal memory may be in the form of volatile memory, random access memory (RAM), and/or non-volatile memory such as read-only memory (ROM) or flash memory (flash RAM) in computer-readable media. Internal memory is an example of computer-readable media.

Computer-readable media include non-volatile, volatile, movable, and non-movable media and may achieve information storage by any method or technology. Information may be computer-readable instructions, data structures, program modules, or other data. Examples of computer storage media include, without limitation, phase change random access memory (PRAM), static random access memory (SRAM), dynamic random access memory (DRAM) and other types of random access memory (RAM), read-only memory (ROM), electrically erasable programmable read only memory (EEPROM), flash memory or other memory technologies, compact disc-read-only memory (CD-ROM), digital video disk (DVD) or other optical memory, cassette type magnetic tape, tape disk memory or other magnetic storage devices, or any other non-transfer media. They may be used to store information that is accessible to computer devices. According to the definition in this document, computer-readable media do not include transitory media, such as modulated data signals and carriers.

It should be further noted that terms "include", "contain", "comprise," or their variants are intended to cover non-exclusive inclusion so that a process, method, commodity, or equipment including a series of elements not only includes these elements but also includes other elements not clearly set out, or also includes the elements inherent to such process, method, commodity or equipment. Unless otherwise limited, the elements defined by the phrasing "including one" do not exclude the presence of other similar elements in the process, method, commodity, or equipment including the elements.

Those skilled in the art should understand that the embodiments of the specification may be provided as methods, systems, or computer program products, so the application may adopt embodiments in the form of pure software, pure hardware, or a combination of software and hardware. Furthermore, the application may adopt the form of a computer program product implemented on one or a plurality of computer-usable storage media (including but not limited to disk memory, CD-ROM, and optical memory) that contain computer-usable program codes.

The foregoing descriptions are embodiments of the specification and are not intended to limit the application. For those skilled in the art, the specification may have various changes and modifications. All modifications, equivalent substitutions, and improvements made without departing from the spirit and principles of the application shall fall within the scope of the claims of the application.

What is claimed is:

1. A method comprising:
   receiving a data authentication request comprising a version identifier of a first data version of a target object and a first check value determined based on content of the target object, wherein the target object is stored external to a blockchain;
   obtaining, from the blockchain, a data block comprising a second check value of the first data version based on a mapping relationship between a version identifier of the first data version and a block identifier of the obtained data block, wherein the mapping relationship between the version identifier of the first data version and the block identifier of the obtained data block is stored in a database external to the blockchain; and
   authenticating the content of the target object by comparing the first check value and the second check value.

2. The method of claim 1, wherein the authenticating the content of the target object by comparing the first check value and the second check value comprises:
   when the second check value is the same as the first check value, determining that the content of the target object is authentic; and
   when the second check value is different from the first check value, determining that the content of the target object has been modified.

3. The method of claim 1, wherein the obtaining a data block comprising a second check value of the first data version based on a mapping relationship between a version identifier of the first data version and a block identifier of the obtained data block comprises:
   determining the block identifier based on the mapping relationship; and
   identifying the data block from the blockchain based on the determined block identifier.

4. The method of claim 1, wherein the first check value is determined by:
   determining a data content summary of the first data version of the target object; and
   calculating a hash value of the data content summary based on a hash algorithm to obtain the first check value.

5. The method of claim 4, wherein the data block further comprises:
   the data content summary of the first data version of the target object; or
   data content of the first data version of the target object.

6. The method of claim 1, wherein the data block further comprises:
   a different check value corresponding to a second data version of the target object, wherein the second data version is adjacent to the first data version.

7. The method of claim 6, further comprising, prior to receiving the data authentication request:
   determining the second check value of the first data version of the target object;
   obtaining the different check value from the blockchain;
   creating the data block based on the second check value and the different check value; and
   storing the data block in the blockchain.

8. The method of claim 1, further comprising:
   storing the content of the target object in a cloud data gateway or a database.

9. A non-transitory computer-readable storage medium, configured with instructions executable by one or more processors to cause the one or more processors to perform operations comprising:
   receiving a data authentication request comprising a version identifier of a first data version of a target object and a first check value determined based on content of the target object, wherein the target object is stored external to a blockchain;
   obtaining, from the blockchain, a data block comprising a second check value of the first data version based on a mapping relationship between a version identifier of the first data version and a block identifier of the obtained data block, wherein the mapping relationship between the version identifier of the first data version and the block identifier of the obtained data block is stored in a database external to the blockchain; and
   authenticating the content of the target object by comparing the first check value and the second check value.

10. The medium of claim 9, wherein the authenticating the content of the target object by comparing the first check value and the second check value comprises:
    when the second check value is the same as the first check value, determining that the content of the target object is authentic; and
    when the second check value is different from the first check value, determining that the content of the target object has been modified.

11. The medium of claim 9, wherein the obtaining a data block comprising a second check value of the first data version based on a mapping relationship between a version identifier of the first data version and a block identifier of the obtained data block comprises:
    determining the block identifier based on the mapping relationship; and
    identifying the data block from the blockchain based on the determined block identifier.

12. The medium of claim 9, wherein the first check value is determined by:
    determining a data content summary of the first data version of the target object; and
    calculating a hash value of the data content summary based on a hash algorithm to obtain the first check value.

13. The medium of claim 12, wherein the data block further comprises:
    the data content summary of the first data version of the target object; or
    data content of the first data version of the target object.

14. The medium of claim 9, wherein the data block further comprises:
    a different check value corresponding to a second data version of the target object, wherein the second data version is adjacent to the first data version.

15. The medium of claim 14, wherein the operations further comprise, prior to receiving the data authentication request:
    determining the second check value of the first data version of the target object;
    obtaining the different check value from the blockchain;
    creating the data block based on the second check value and the different check value; and
    storing the data block in the blockchain.

16. The medium of claim 9, wherein the operations further comprise:
    storing the content of the target object in a cloud data gateway or a database.

17. A system comprising a processor and a non-transitory computer-readable storage medium storing instructions executable by the processor to cause the system to:
- receive a data authentication request comprising a version identifier of a first data version of a target object and a first check value determined based on content of the target object, wherein the target object is stored external to a blockchain;
- obtain, from the blockchain, a data block comprising a second check value of the first data version based on a mapping relationship between a version identifier of the first data version and a block identifier of the obtained data block, wherein the mapping relationship between the version identifier of the first data version and the block identifier of the obtained data block is stored in a database external to the blockchain; and
- authenticate the content of the target object by comparing the first check value and the second check value.

18. The system of claim 17, wherein the first check value is determined by:
- determining a data content summary of the first data version of the target object; and
- calculating a hash value of the data content summary based on a hash algorithm to obtain the first check value.

* * * * *